United States Patent
Chu et al.

(10) Patent No.: US 9,152,921 B2
(45) Date of Patent: *Oct. 6, 2015

(54) COMPUTING REGRESSION MODELS

(71) Applicant: International Business Machines Corporation, Armonk, NY (US)

(72) Inventors: Yea J. Chu, Chicago, IL (US); Dong Liang, Shaanxi (CN); Jing-Yun Shyr, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,462

(22) Filed: Mar. 21, 2014

(65) Prior Publication Data

US 2014/0207722 A1 Jul. 24, 2014

Related U.S. Application Data

(63) Continuation of application No. 13/739,667, filed on Jan. 11, 2013.

(51) Int. Cl.
  *G06F 9/46* (2006.01)
  *G06N 5/04* (2006.01)
  *G06F 9/48* (2006.01)
  *G06F 9/50* (2006.01)

(52) U.S. Cl.
  CPC ............... *G06N 5/04* (2013.01); *G06F 9/4843* (2013.01); *G06F 9/5066* (2013.01)

(58) Field of Classification Search
  None
  See application file for complete search history.

(56) References Cited

U.S. PATENT DOCUMENTS

| | | | |
|---|---|---|---|
| 2008/0086442 A1* | 4/2008 | Dasdan et al. | 707/1 |
| 2008/0154817 A1 | 6/2008 | Tesauro et al. | |
| 2010/0162230 A1* | 6/2010 | Chen et al. | 717/177 |
| 2010/0257198 A1* | 10/2010 | Cohen et al. | 707/770 |
| 2011/0066649 A1 | 3/2011 | Berlyant et al. | |
| 2011/0154341 A1* | 6/2011 | Pueyo et al. | 718/101 |

(Continued)

FOREIGN PATENT DOCUMENTS

| | | |
|---|---|---|
| CN | 102385719 | 3/2012 |
| CN | 102662639 | 9/2012 |
| GB | 2485783 | 5/2012 |

OTHER PUBLICATIONS

M. Schatzoff, R. Tsao, S. Fienberg; Efficient Calculation of All Possible Regressions; Nov. 1968; p. 769-779.*

(Continued)

*Primary Examiner* — Emerson Puente
*Assistant Examiner* — Dong Kim
(74) *Attorney, Agent, or Firm* — Janaki K. Davda; Konrad, Raynes, Davda and Victor LLP

(57) ABSTRACT

Provided are techniques for computing a task result. A processing data set of records is created, wherein each of the records contains data specific to a sub-task from a set of actual sub-tasks and contains a reference to data shared by the set of actual sub-tasks, and wherein a number of the records is equivalent to a number of the actual sub-tasks in the set of actual sub-tasks. With each mapper in a set of mappers, one of the records of the processing data set is received and an assigned sub-task is executed using the received one of the records to generate output. With a single reducer, the output from each mapper in the set of mappers is reduced to determine a task result.

7 Claims, 10 Drawing Sheets

(56) References Cited

U.S. PATENT DOCUMENTS

| | | | |
|---|---|---|---|
| 2011/0213655 A1* | 9/2011 | Henkin et al. | 705/14.49 |
| 2012/0131075 A1 | 5/2012 | Mawdsley et al. | |
| 2012/0198466 A1* | 8/2012 | Cherkasova et al. | 718/104 |
| 2013/0024412 A1* | 1/2013 | Gong et al. | 706/46 |
| 2013/0201452 A1* | 8/2013 | Crabb et al. | 351/224 |

OTHER PUBLICATIONS

Chu, C., S.K. Kim, Y. Lin, Y.Y. Yu, G. Bradski, A.Y. Ng, and K. Olukotun, "Map-Reduce for Machine Learning on Multicore", 2006, retrieved from the Internet at <URL: http://www.cs.stanford.edu/people/ang/papers/nips06-mapreducemulticore.pdf>, Total 8 pp.

Gatu, C. and Konotoghiorghes, E.J. (2003), "Parallel Algorithms for Computing all Possible Subset Regression Models Using the QR Decomposition," Parallel Computing, 29, 505-521. [Also Total 17 pp.].

Gillick, D., A. Faria, and J. Denero, "MapReduce: Distributed Computing for Machine Learning", Dec. 18, 2006, Total 12 pp.

"Hadoop Tips: Passing Parameters to Mappers and Reducers", [online], [Retrieved on Oct. 4, 2012]. Retrieved from the Internet at <URL: http://www.thecloudavenue.com/2011/11/passing-parameters-to-mappers-and.html>, Nov. 30, 2011, Total 3 pp.

Jin, C., C. Vecchiola, and R. Buyya, "MRPGA: An Extension of MapReduce for Parallelizing Genetic Algorithms", Grid Computing and Distributed Systems (GRIDS) Laboratory, Department of Computer Science and Software Engineering, 2008.

Johnson, N., "Exploring the New Mapper API—Nick's Blog", [online], [Retrieved on Mar. 30, 2012]. Retrieved from the Internet at <URL: http://blog.notdot.net/2010/05/Exploring-the-new-mapper-API>, Total 7 pp.

Mell, P., T. Grance, and L. Badger, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", Recommendations of the National Institute of Standards and Technology, Jan. 2011, Total 7 pp.

Noll, M.G., "Writing an Hadoop MapReduce Program in Python", [online], [Retrieved on Oct. 4, 2012]. Retrieved from the Internet at <URL: http://www.michael-noll.com/tutorials/writing-an-hadoop-mapreduce-program-in-python/>, Total 8 pp.

Pozdnoukhov, A. and C. Kaiser, "Scalable Local Regression for Spatial Analytics", ACM GIS'11, 2011, ACM, Total 10 pp.

Sul, S. and A. Tovchigrechko, "Parallelizing BLAST and SOM Algorithms with MapReduce—MPI Library", 2011 IEEE International Parallel & Distributed Processing Symposium, 2011 IEEE, Total 9 pp. (Also Available at: http://www.hicomb.org/papers/HICOMB2011-01.pdf).

U.S. Appl. No. 13/739,667, filed Jan. 11, 2013, entitled "Computing Regression Models", invented by Yea .J. Chu et al., pp. 1-47.

Preliminary Amendmdnet, dated Mar. 21, 2014, for U.S. Appl. No. 13/739,667, filed Jan. 11, 2013, entitled "Computing Regression Models", invented by Yea .J. Chu et al., pp. 1-7.

Patent Cooperation Treaty (PCT), Notification of Transmittal of the International Search Report and the Written Opinion of the International Searching Authority of the Declaration, dated Apr. 28, 2014, for International Application PCT/IB2013/059603, filed Oct. 24, 2013, Total 11 pages.

Office Action, dated Feb. 3, 2015, for U.S. Appl. No. 13/739,667, filed Jan. 11, 2013, invented by Yea Chu et al., Total 36 pages.

Response to Office Action, dated May 1, 2015, for U.S. Appl. No. 13/739,667, filed Jan. 11, 2013, invented by Yea Chu et al., Total 13 pages.

Notice of Allowance, Jun. 1, 2015, for U.S. Appl. No. 13/739,667, filed on Jan. 11, 2013 by Y.J. Chu et al., Total 14 pp.

\* cited by examiner

| $\ell$ | $S_\ell$ | Sequence of models produced |
|---|---|---|
| 0 | 0 | Only intercept |
| 1 | 1 | (1) |
| 2 | 121 | (1),(12),(2) |
| 3 | 1213121 | (1),(12),(2),(23),(123),(13),(3) |
| 4 | $\underbrace{1213121}_{S_3}\ 4\ \underbrace{1213121}_{S_3}$ | (1),(12),(2),(23),(123),(13),(3),(34),(134),(1234),(234),(24),(124),(14),(4) |
| $k$ | $S_{k-1}, k, S_{k-1}$ | All $2^k$ models including the intercept-only model. |

FIG. 2

COMPUTING REGRESSION MODELS

FIELD

Embodiments of the invention relate to computing possible regression models using a sweep operation in a map-reduce framework.

BACKGROUND

Multiple linear regression models are usually used to analyze the relationship between one target variable (Y) and a list of predictor variables (X). Numerous techniques, such as forward selection, backward elimination, forward stepwise, etc., have been proposed to select some predictors, which influence the target more than other predictors, out of a large set of k predictors.

A predictor may be described as a field that predicts or influences a target in a predictive regression model. A target may be described as a field that is predicted or influenced by one or more predictors in a regression model.

One way of finding the best regression is to carry out all $2^k$ regression models based on a selected criterion, such as adjusted R square, etc. This technique is also called "exhaustive search". When k is large, it might not be practical to carry out all possible regressions as the computing time grows exponentially with k. There have been efforts to improve performance and they are roughly along two paths: (1) utilizing sequential strategies for moving from one regression model to another regression model; and (2) utilizing parallel computing strategies to distribute the intensive computation.

The map-reduce framework has become a popular paradigm because it can handle petabytes of data in distributed data sources which are increasingly common in the internet era. The map-reduce framework enables applications to work with thousands of nodes in the distributed clusters. A typical map-reduce job usually uses multiple mappers to do computation on different data splits/blocks and one or more reducers to merge the mapper results together such that the final results/statistics are based on the whole data.

SUMMARY

Provided are a method, computer program product, and system for computing a task result. A processing data set of records is created, wherein each of the records contains data specific to a sub-task from a set of actual sub-tasks and contains a reference to data shared by the set of actual sub-tasks, and wherein a number of the records is equivalent to a number of the actual sub-tasks in the set of actual sub-tasks. With each mapper in a set of mappers, one of the records of the processing data set is received and an assigned sub-task is executed using the received one of the records to generate output. With a single reducer, the output from each mapper in the set of mappers is reduced to determine a task result.

BRIEF DESCRIPTION OF THE SEVERAL VIEWS OF THE DRAWINGS

Referring now to the drawings in which like reference numbers represent corresponding parts throughout:

FIG. 2 illustrates a sequence of regression models in a table in accordance with certain embodiments.

FIG. 6 is formed by FIG. 6A and FIG. 6B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments utilize a map-reduce framework to compute $2^k$ possible regression models for k predictors by using sweep operations. Embodiments use multiple nodes (mappers) to compute local regression models (e.g., local best regression models) in parallel, and then use one node (reducer) to combine the results from the multiple nodes to select a global regression model (e.g., global best regression model) from the local regression models. Embodiments decompose the global search sequence into multiple local search sequences in a systematic way, and the local search sequences can be conducted independently on the multiple nodes. A local search sequence may be described as a sub-sequence from the global search sequence.

A node may be described as an execution unit that is relevant to one Central Processing Unit (CPU) core in a cluster. A cluster may be described as having multiple nodes, and the nodes may be on the same or different computers. In certain embodiments, a node may execute one map or reduce task.

In certain embodiments, the multiple mappers and the single reducer may execute on a single computer/machine with multiple CPU cores. In certain embodiments, the multiple mappers and the single reducer may execute on different computers/machines.

Figure 1:
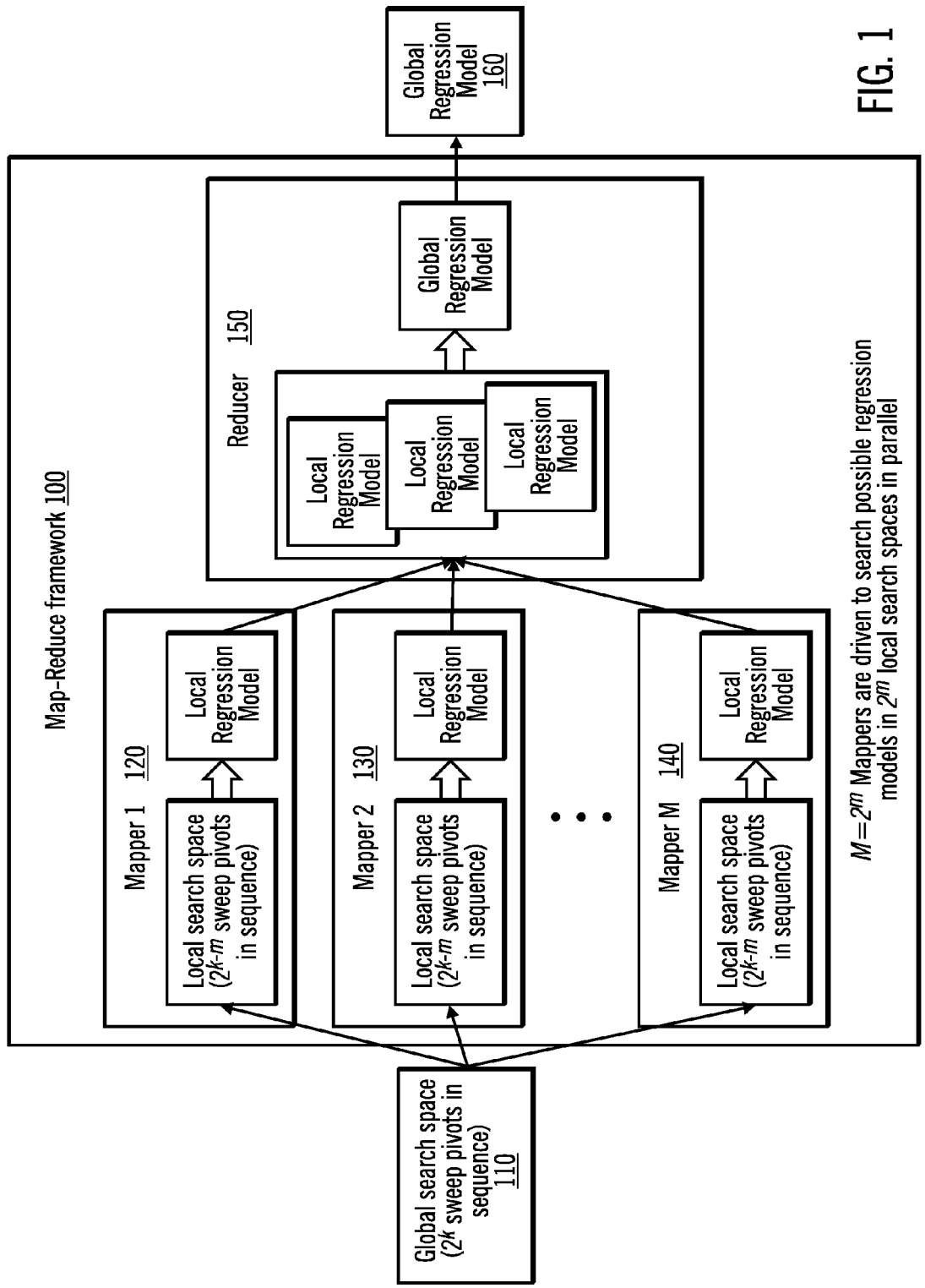
FIG. 1 illustrates a map-reduce framework in accordance with certain embodiments.

Embodiments break down the global search sequence/space into M (=$2^m$), where m<k-1, local search sequences/spaces, apply the sweep operations on the local search sequences of $2^{k-m}$ sweep pivots, which yield $2^{k-m}$ regression models. A pivot corresponds to a particular diagonal element of a matrix on which the sweep operation is applied. Then, embodiments find the local regression model in M mappers in parallel, and use one reducer to combine the results from the mappers to find the global regression model. FIG. 1 illustrates a map-reduce framework 100 in accordance with certain embodiments. In certain embodiments, the computing architecture is used to compute all possible regression models in the map-reduce framework 100. The map-reduce framework 100 receives as input a global search space 100 and outputs a global regression model 160. The map-reduce framework 100 includes mappers 120, 130, . . . 140 and a reducer 150. The global search space 100 is partitioned into local search spaces. Each mapper 120, 130, . . . 140 receives a local search space and outputs a local regression model to the reducer 150. The reducer 150 uses the local regression model from each mapper 120, 130, . . . 140 to identify a global regression model, which is output as the global regression model 160.

Embodiments leverage the map-reduce framework 100 in the development of a regression model solution. Embodiments also use a sweep operation.

Sweep Operations

Merely to enhance understanding of embodiments, sweep operation properties are discussed herein.

In a regression model, a predictor may be a continuous field or a categorical field. A categorical field may be described as having a finite number of nominal or ordinal categories as values. Based on a parameterization technique, each categorical predictor with J categories may be expanded with J dummy variables, thus, there are J coefficients corresponding to a categorical predictor in the regression model.

Suppose there are k effects in the predictor X matrix. Since k effects might include both continuous predictors and categorical predictors (in fact, some of k effects may be a combination of several predictors, but to keep it simple and without loss of generality, they are excluded so k effects are k predictors), the number of coefficients, say p, in the regression model may be larger than k. There is a closed-form solution for regression coefficients, $\hat{\beta}$, based on the normal equation $X^T X \hat{\beta} = X^T Y$, where Y is an n×1 vector with n is the number of records, X is an n×p matrix derived from k predictors and $\hat{\beta}$ is an p×1 vector of coefficient estimates. A technique to obtain $\hat{\beta}$ is the sweep operation. The sweep operation works as follows: the cross product (p+1)×(p+1) matrix $$C = \begin{pmatrix} X^T X & X^T Y \\ Y^T X & Y^T Y \end{pmatrix}$$

is swept on the first p pivots or pivotal elements, and the result is:

$$C^* = \begin{pmatrix} (X^T X)^- & (X^T X)^- X^T Y \\ -Y^T X (X^T X)^- & Y^T Y - Y^T X (X^T X)^- X^T Y \end{pmatrix}$$
$$= \begin{pmatrix} (X^T X)^- & \hat{\beta} \\ -\hat{\beta} & SSE \end{pmatrix},$$

where the residual Sum of Squares (SSE) is the residual sum of squares that is usually needed in computation of the criterion used in selecting the regression model. In general, sweeping C on any subset of the first p pivotal elements yields the estimates of the regression coefficients corresponding to the regression of Y on that subset of the X's.

There are two properties of the sweep operation: (1) reversible (two successive sweeps with the same pivotal element are the same as the null operation) and (2) commutative (a sweep on the $r^{th}$ and then on the $s^{th}$ pivotal element gives the same result as the reverse sequence of sweeps). Using these properties, each application of the sweep operation to a particular row and column (for a continuous predictor) or a particular set of J rows and columns (for a set of J dummy variables corresponding to a categorical predictor) of C either introduces the predictor into the fitted regression model or removes the predictor if the predictor was already in the model. That is, each sweep operation on one predictor results in a regression model. In certain embodiments, the possible $2^k - 1$ regressions may be obtained through a sequence of $2^k - 1$ sweep operations, as follows:

When k=1, $2^k - 1 = 1$ and the single regression is performed by sweeping on the pivotal element(s) corresponding to the $1^{st}$ predictor. The sequence of pivot is $S_1 = \{1\}$.

When k=2, the first regression is performed by sweeping on the $1^{st}$ predictor. Now, sweeping on the $2^{nd}$ predictor will produce a new regression which includes both the $1^{st}$ and $2^{nd}$ predictors. Then, sweeping on the $1^{st}$ predictor again will delete the $1^{st}$ predictor and produce a regression including the $2^{nd}$ predictor only. All $2^k - 1 = 3$ regression models are produced by sweeping the C matrix on a sequence of pivots $S_2 = \{121\}$.

When k=3, the first 3 regressions are obtained in the sequence $S_2$. Now, sweeping on the $3^{rd}$ predictor produces a new regression that adds the $3^{rd}$ predictor to the regression produced by the sequence $S_2$. Since the sequence $S_2$ produced 3 distinct regressions not including the $3^{rd}$ predictor, repetition of the sequence $S^2$ will produce another 3 regressions including the $3^{rd}$ predictor. Then $2^k - 1 = 7$ regression models are produced by sweeping the C matrix on a sequence of pivots $S_3 = \{S_2, 3, S_2\} = \{1213121\}$.

Assume that all $2^{k-1}$ possible regressions on k−1 predictors may be obtained in a sequence $S_{k-1}$ on the first k−1 predictors. Now, sweeping on the $k^{th}$ predictor produces a new regression model that adds the $k^{th}$ predictor to the regression model produced by the sequence $S_{k-1}$. Then, repetition of the sequence $S_{k-1}$ produces another $2^{k-1}$ distinct regression models, including the $k^{th}$ predictor. Thus, the $2^k - 1$ regression models are produced by sweeping the C matrix on a sequence of pivots $S_k = \{S_{k-1}, k, S_{k-1}\}$.

FIG. 2 illustrates a sequence of regression models in a table 200 in accordance with certain embodiments. In FIG. 2, $S_l$ identifies indexes of predictors which are pivoted on. In FIG. 2, each parentheses in the third column represents a regression model. The numbers in the parentheses indicate the predictors which are included in that regression model.

From table 200, the sequence with 4 predictors looks like: S4={121312141213121} (the 2nd column) and produces 15 regression models (the 3rd column) (and there are 16 regression models if the intercept-only regression model is included). The size of the search sequence is 15.

One technique is a recursive process for constructing the sequence $S_k$, i.e., $S_k = \{\underline{S_{k-1}}, k, \underline{S_{k-1}}\} = \{\underline{S_{k-2}}, k-1, \underline{S_{k-2}}, k, \underline{S_{k-2}}, k-1, \underline{S_{k-2}}\} = \ldots$, etc. and $2^k - 1$ regression models may be produced sequentially. On the other hand, it is easy to see that the sequence $S_k$ may be decomposed to several sub-sequences, and then a subset of $2^k - 1$ regression models may be produced from each sub-sequence. For example, to decompose the sequence $S_4 = \{S_3, 4, S_3\} = \{S_2, 3, S_3, 4, S_2, 3, S_2\} = \{121, \underline{3}, 121, \underline{4}, 121, \underline{3}, 121\}$ to 4 sub-sequences or local sequences, they are {121}, {3121}, {34121}, {4121}, and the 15 regression models may be produced by those 4 sub-sequences in parallel.

Regression Models

To use the sweep operation to generate regression models, embodiments first compute the cross product matrix C, which is based on X and Y and which is a (p+1)×(p+1) matrix. The computation is done in the map-reduce framework for large and distributed data sources. Then, computation of $2^k$ regression models applies the sweep operation repeatedly on the C matrix. Since such computation is not based on data sources, it is not a typical map-reduce job. Hence, embodiments provide a technique to leverage the latent capability of parallel computation in the map-reduce framework to compute the $2^k$ regression models.

Embodiments (1) specify the right number of mappers to fully and efficiently utilize the available nodes in a cluster; and (2) provide the minimal amount of input to each mapper to carry out a subset of $2^k$ regression models correctly.

Suppose L is the number of available Central Processing Unit (CPU) cores in the distributed cluster and it is known, then the number of mappers or actual sub-tasks, M, is specified based on the following two rules:

(a) M≤L: in certain embodiments, to obtain better efficiency. In alternative embodiments, M>L is used.

(b) $M=2^m$ with m<k−1: the size of each local search sequence is $2^{k-m}$ then M mappers can cover the $2^k$ regression models.

In a typical map-reduce job, the input for mappers is data from splits/blocks, so the number of data splits determines the number of mappers. A split may be described as a subset of a large dataset that is divided into fixed-size portions. For example, embodiments create one map task for each split, which runs the user-specified map function for each record in the split. In certain embodiments, for most jobs, a good split size tends to be the size of a Hadoop Distributed File System (HDFS) block, which is 64 MB by default, although this can be changed for the cluster (for all newly created files) or specified when each file is created.

Computation of $2^k$ regression models here is not based on original data splits. Instead, embodiments may control that there are M mappers by creating a temporary input file with M rows, configuring the split size as a size of one row such that there will be M splits, then M mappers are derived.

The information of one row in the temporary input file is sent to one input split and one mapper. The information for this row includes the local search sequence that tells a mapper how the order of the sweep operations is to be applied to obtain a sequence of regression models. The local search sequence is different for different mappers such that the combination of the local sequences produces the $2^k$ possible regression models. In certain embodiments, sending each whole, local search sequence to different mappers may increase network traffic if k is large. Thus, embodiments send a portion of each local search sequence (i.e., leading-index sequences) to the different mappers so that the network traffic is reduced. The reason this can be done is because the local search sequences may be further decomposed to two parts: (i) a "common-index sequence" and (ii) a "leading-index sequence".

The "common-index sequence is the same for all local search sequences and is associated with the same group of predictors (called "common-index predictors") so the common-index sequence may be generated within each mapper instead of sending the common-index sequence over the network.

The leading-index sequence is different for different local search sequences and is associated with different predictors (called "leading-index predictors") so each of them is sent to different mappers. In certain embodiments, the leading-index sequence are much smaller than the common-index sequence so sending just the leading-index sequences (rather than both the leading-index sequences and the common-index sequence) may reduce the network traffic.

In addition to the individual information sent to different mappers, the second part of the input is the same for all mappers and includes the cross product matrix, C, the common-index predictors, etc. The common-index sequence may be generated within each mapper based on the common-index predictors.

Embodiments utilizing the map-reduce framework may either carry out all possible regression models with a much larger number of predictors or improve the performance for a fixed number of predictors. Therefore, embodiments are scalable and improve the capability of finding the best regression model when the number of predictors k is large. Embodiments are efficient by controlling the number of mappers and also reduce the size of information traveling over the network. Embodiments are balanced as the work load may be evenly distributed among the mappers.

Embodiments consist of two parts to fit computation of $2^k$ possible regression models into the map-reduce framework 100: (1) each of the $M=2^m$ mappers receives instructions to carry out a subset of $2^k$ possible regression models and sends the local regression model to a reducer; (2) the reducer selects the local regression models to find the global regression model for output (e.g., to a distributed file system). A regression model, like any other predictor model, may be used for prediction and/or discovery and interpretation of relationships between the target and a set of predictors.

Figure 3:
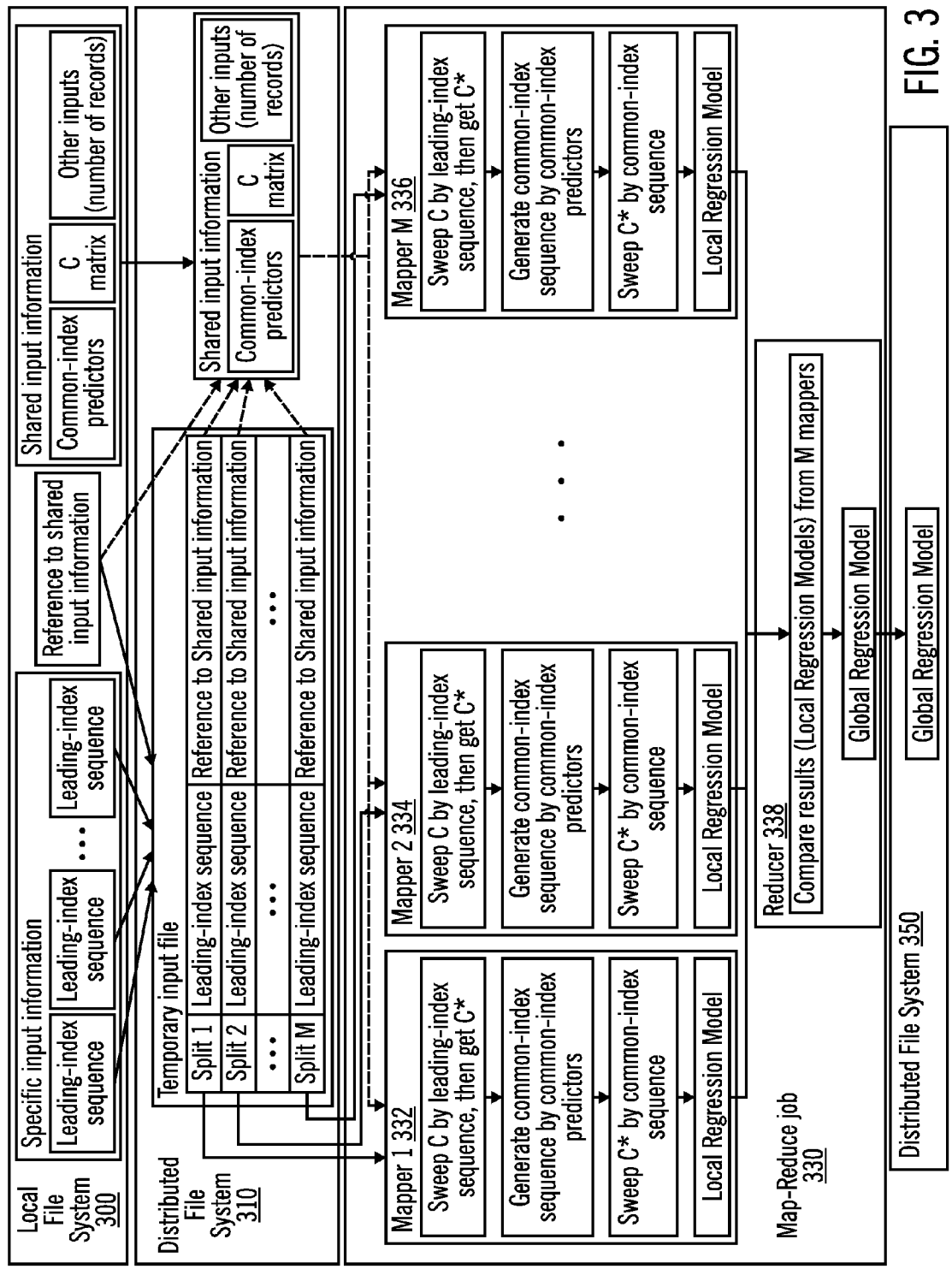
FIG. 3 illustrates an overall process for computing possible regression models in accordance with certain embodiments.

Embodiments may be implemented with the map-reduce framework 100 and a distributed file system (e.g., a Hadoop Distributed File System (HDFS)). FIG. 3 illustrates an overall process for computing possible regression models in accordance with certain embodiments. In certain embodiments, all possible regression models are computed. FIG. 3 includes a local file system 300, a distributed file system 310, and a map-reduce job 330.

The local file system 300 stores (1) specific input information which is the leading-index sequences; (2) shared input information which includes common-index predictors, a C matrix, and other inputs (e.g., number of records); and (3) a reference to shared input information, which identifies a location of the shared input information in the distributed file system 310. In certain embodiments, the reference may be a Uniform Resource Identifier (URI), which is a string of characters used to identify a name or a resource of shared input information in the distributed file system 310. The distributed file system 310 includes (1) a temporary file that includes Split 1, Split 2, . . . Split M (M rows), where each split contains a specific leading-index sequence plus the reference to the shared input information, and (2) shared input information which is uploaded from the local file system. The map-reduce job 330 includes mapper 1 332, mapper 2 334, . . . mapper M 336, and reducer 338.

Shared input information is uploaded from the local file system 300 onto the distributed file system 310. At the same time, the reference to the shared input information in the distributed file system is recorded. Then, a temporary file with M rows is created in the distributed file system 310. One lead-index sequence plus the reference to the shared input information are written into one row of the temporary file. The size of one input split is configured as the size of one row in the temporary file, which is used to drive a map-reduce job with specified number (M) of mappers. Thus one row corresponds to one split and one mapper. When a mapper 332, 334, . . . , 336 is driven, the mapper 332, 334, . . . , 336 extracts the content in each input split. The mapper 332, 334, . . . , 336 identifies the location of shared input information in the distributed file system 310 by the reference and downloads the shared input information into its local file system. With the specific leading-index sequence and the shared input information, the mapper performs a local search and generates a local regression model, which is output to the reducer 338. The reducer 338 compares results from the local regression models from the mappers 332, 334, ..., 336 and outputs a global regression model to the distributed file system 350. In certain embodiments, the distributed file systems 310, 350 are the same distributed file system, while in other embodiments, the distributed file systems 310, 350 are different distributed file systems.

In certain embodiments, the reference does not have to be stored in the temporary file. In certain embodiments, the reference may be stored as a property in the instance of the configuration and passed to each mapper through a configuration Application Programming Interface (API) within a Hadoop framework. Then, all mappers receive this reference and know where to extract the shared input information in HDFS. In other embodiments, a reference is stored and passed through the temporary file for map-reduce frameworks.

Given the number of available CPU cores, L, in the distributed cluster, and the index of the k predictors (denoted as 1, ..., k), the number of mappers, M, may be specified as M≤L and M=$2^m$ with m<k−1, and the k predictors may be divided into m leading-index predictors and k−m common-index predictors. The global search sequence with a size of $2^k$ is decomposed into M local search sequences with a size of $2^{k-m}$ to produce $2^{k-m}$ regression models in each mapper.

In a typical map-reduce job, the input is a dataset stored in the distributed file system. In order to distribute the computation to multiple nodes, the data is divided into multiple pieces, and each piece is called an input split. The default input split size is the default block size of the distributed file system. Thus, the number of mappers is determined by the number of data blocks of the input data set. In other words, the number of mappers is determined by the volume of the input data. That is, as the dataset gets larger, the number of mappers increases.

With embodiments, the computation of $2^k$ regression models is not based on original data splits, so embodiments create a temporary input file with M rows and reconfigure the input split size as the size of one row in order to control the number of mappers in the specified map-reduce job to be driven. The content of one row is sent to one mapper to produce $2^{k-m}$ regression models. The natural candidate for the content of rows is a local search sequence. However, the size of a local search sequence ($2^{k-m}$) might still be large when k is large. Hence, embodiments include a small part of a local search sequence (i.e., the leading-index sequence generated based on m leading-index predictors) in each row. The other part of a local search sequence (i.e., the common-index sequence generated based on k−m common-index predictors) is generated within each mapper. In general, the size of the leading-index sequence (m) is smaller than the size of the common-index sequence ($2^{k-m}-1$), when k is large, therefore, sending only leading-index sequences to different mappers reduces the network traffic immensely.

Before driving a map-reduce job, the leading-index sequences and the reference to shared input information are written into a single file with M rows, where each row represents one leading-index sequence plus the reference to shared input information. The length of each row is kept the same by filling spaces for those leading-index sequences with a smaller size. The file is saved in the distributed file system as the input of the mappers. The input split size is configured as the size of one row so M splits may be derived from the input file with M rows, then M splits determine M mappers. Moreover, the input key/value is defined to correspond to one row, where the key is the offset of the row, and the value is the content of the corresponding row in the file. Therefore, each mapper receives one key/value pair and then extracts one specific leading-index sequence and the reference to shared input information.

The second part of the input is shared (same) input information for the mappers. The second part of the input includes (1) the C matrix, which is used to generate different regression models by applying the sweep operations on the C matrix in accordance with the leading-index sequence plus the common-index sequence as pivots; (2) the number of records, which is used to compute the criterion value (in addition to SSE); and (3) a list of the common-index predictors, which is used to generate the common-index sequence within the mappers. To ensure shared input information to be transported correctly in the network, the shared input information may be serialized into a file (or file stream) and stored in the distributed file system. Then, every mapper may copy shared input information to the local system within the mapper from the distributed file system via the reference to shared input information.

With these two parts of the input, each mapper conducts the following tasks: (1) apply the sweep operations on the C matrix for the whole leading-index sequence assigned to that mapper to produce one regression model and a resulting C matrix that is C*; (2) generate the common-index sequence based on the common-index predictors; (3) sweep the pivots in the C* matrix according to the common-index sequence sequentially to produce $2^{k-m}-1$ regression models; (4) find the local regression model based on the criterion values from the $2^{k-m}$ regression models (e.g., if the criterion is adjusted R square, then the local regression model is selected with the largest adjusted R square value; (5) assign a key to the local regression model and specify the results of the local regression model as the value; and (6) pass the local regression model to the reducer via the output key/value pair.

The reducer collects the local regression models through the input key/value pairs to find the global regression model among the M regression models and exports the global regression model to the distributed file system through the output key/value pair. The output key/value pairs of the mappers and the input and output key/value pairs of the reducer may be defined as the same type in order to pass regression models between the mappers, the reducer, and the distributed file system. One key/value pair corresponds to one regression model, with the key defined as an identifier (ID) of one regression model, and the value defined as the relevant results of the regression model.

The time complexity of carrying out the possible regression models without any distributed or parallel computing is $O(2^k)$ with k predictors. On the other hand, the time complexity of the same computation with M mappers is about $O(2^{k-m})$, and the time complexity of the reducer is about O(M). So, the overall time complexity in the map-reduce framework is about $O(2^{k-m})+O(M) \approx O(2^{k-m})$. The larger the number of mappers is, the better the performance will be.

Suppose there are k predictors with m leading-index predictors and k−m common-index predictors. A pre-ordering operation is performed: continuous predictors (having 1 category) are selected first, then, categorical predictors are sorted in ascending order in terms of the number of categories. Without loss of generality, embodiments assign the indices of k pre-ordered predictors to be 1, ..., k, so the predictor k would have the largest number of categories. Moreover, the first k−m pre-ordered predictors are assigned to be common-index predictors, and the last m predictors are assigned to be leading-index predictors. This operation ensures that the minimum number of sweep operations is used to carry out the $2^k$ regression models.

Suppose $M=2^m$ mappers are specified. The global search sequence with a size of $2^k$ is decomposed into M local search sequences with a size of $2^{k-m}$, and each local search sequence is further decomposed into two parts: (1) the "common-index sequence", which is associated with k–m common-index predictors and is the same for all mappers; and (2) the "leading-index sequence", which is associated with m leading-index predictors and is different for different mappers. Based on the recursive technique for sweeping operations described above, the common-index sequence is derived from the k–m common-index predictors and is $S_{k-m}$ with a size of $2^{k-m}-1$. The set of leading-index sequences is constructed as the set of l-combinations of m leading-index predictors for all l's (l=0, ..., m), so there would be $2^m$ of them, which are sent to $M=2^m$ mappers. Thus, the maximum size of any leading-index sequence is m, which is smaller than the size of the common-index sequence ($2^{k-m}-1$), if k is large. Then, the network traffic may be reduced by sending the leading-index sequences to mappers and generating the common-index sequence within each mapper.

Figure 4:
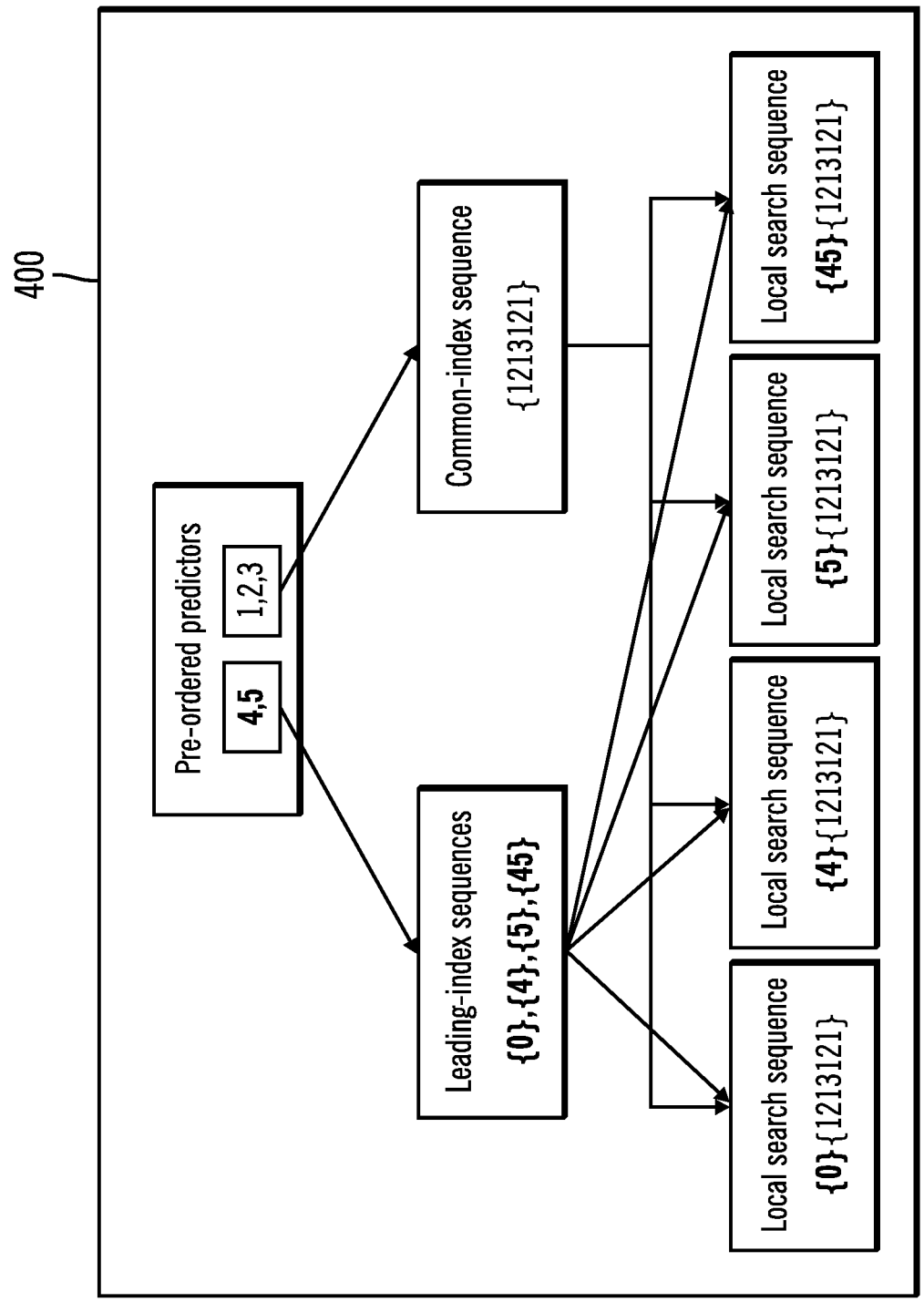
FIG. 4 illustrates an example of dividing a global sequence into local sequences in accordance with certain embodiments.

FIG. 4 illustrates an example of local sequences in accordance with certain embodiments. Merely to enhance understanding an example is provided herein. The example has five predictors and four mappers to demonstrate what the local search sequences, leading-index sequences, and common-index sequence are and their corresponding sizes.

Without embodiments, in a situation with no parallel computing: there are five predictors, and then a global search sequence is generated as {12131214121312151213121412131211} to produce $32=2^5$ regression models sequentially.

In FIG. 4, the panel 400 shows a situation with parallel computing: 5 predictors are pre-ordered and divided into the leading-index predictors 4, 5 and the common-index predictors 1, 2, 3. The set of the leading-index sequences is the set of 0-, 1- and 2-combinations of leading-index predictors 4 and 5: {0} (means no sweep operation is taken), {4}, {5} and {45} so the maximum size is 2. The leading-index sequences may be written as {0 0}, {4 0}, {0 5}, {4 5} to keep the same size in the 4 rows of the temporary input file. The common-index sequence is $S_3=\{1213121\}$, so the size is 7. Then, 4 local sequences are constructed. and each local sequence has one leading-index sequence (producing 1 regression model) plus the common-index sequence (producing 7 regression models), such that 4 local sequences produces the 32 regression models in parallel.

One value in the leading-index sequences or the common-index sequence indicates that the sweep operation is applied to a particular row and column (for a continuous predictor) or a particular set of J rows and columns (for a set of J dummy variables corresponding to a categorical predictor). From 4 local sequences, the common-index predictors 1, 2 and 3 appear 16, 8 and 4 times, so the sweep operations are applied to them 16, 8 and 4 times, respectively; and the leading-index predictors 4 and 5 appear 2 times and are swept 2 times. If the predictor 1 is a continuous predictor, then the number of the sweep operations is 16; but that number becomes 16J when the predictor 1 is a categorical predictor with J categories. Thus the pre-ordering predictors operation is done to ensure that the total number of sweep operations is minimal and some computing time may be saved.

The example of FIG. 4 demonstrates that the size of the common-index sequence ($2^{k-m}-1$) is usually larger than that of the leading-index sequence (m). FIG. 4 also illustrates that, if the leading-index sequences (and not the common-index sequence) are included in the temporary input file with M rows and sent to different mappers, then the network traffic is reduced (because the common-index sequence is not sent). Moreover, as shown in the example of FIG. 4, the pre-ordering operation enables the minimum number of sweep operations to be performed.

Embodiments, utilize the map-reduce properties to: (a) create an input file with M rows for configuring the map-reduce framework to set the input file as M input splits, which is then used to derive M mappers for the specified map-reduce job; (b) divide the input into 2 parts: individual information along with a reference to shared input information that is parsed by key/value pair so that the correct instruction is sent to each mapper; and shared information that is serialized into a file so that the information may be pulled correctly by mappers through the network; and (c) define the key/value pair for the output of each mappers and for the input and output of the reducer with a same type, such that the selected regression models can be passed correctly in the network.

Embodiments send the leading-index sequences, but not the common-index sequence, to mappers, such that the network traffic may be reduced where: (a) the set of the leading-index sequences is the set of l-combinations of m leading-index predictors for all l's (l=0, ..., m); (b) the pre-ordering operation assigns categorical predictors to be leading-index predictors if there exist some categorical predictors and ensures that the minimum number of sweep operations is performed.

Figure 5:
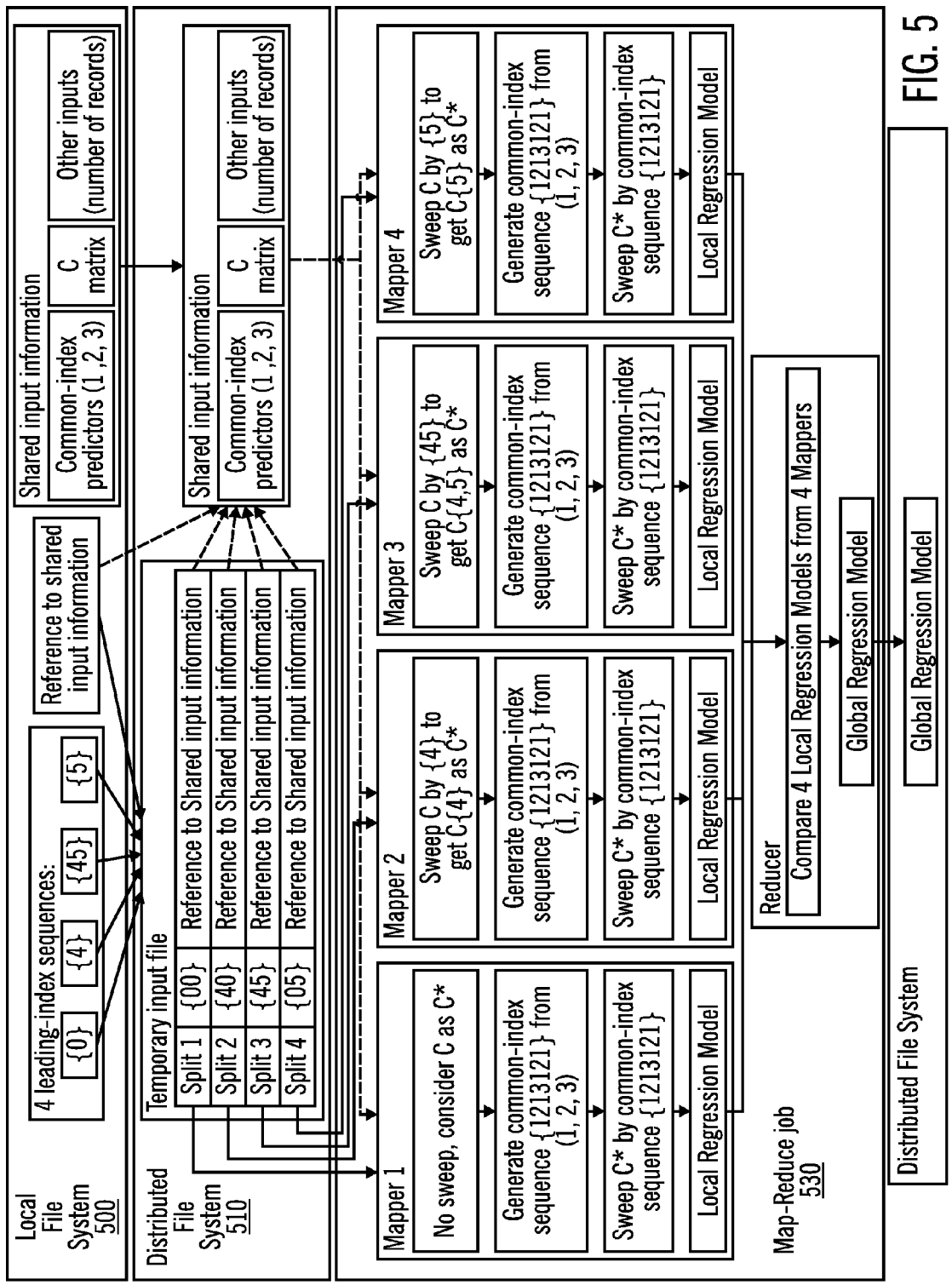
FIG. 5 illustrates an example of a map-reduce framework implementation in accordance with certain embodiments.

FIG. 5 illustrates an example of a map-reduce framework implementation in accordance with certain embodiments. FIG. 5 will be discussed with reference to the same example discussed with reference to FIG. 4. Again, for this example, assume that there are five predictors and four mappers. FIG. 5 includes a local file system 500, a distributed file system 510, and a map-reduce job 530.

The predictors 1, 2 and 3 are common-index predictors, and the corresponding common-index sequence is {1213121}. In FIG. 5, only the common-index predictors are sent to all four mappers, then the common-index sequence is generated by each mapper based on the common-index predictors.

The predictors 4 and 5 are leading-index predictors, but the corresponding leading-index sequences are different such that the input sent to the mappers is different. In the map-reduce framework of FIG. 5, the leading-index sequences are {0}, {4}, {45}, {5}, and they are included in the file as 4 rows which is sent to the mappers, then each mapper sweeps the C matrix on one particular sequence to get the resulting C matrix.

In the map-reduce framework, each mapper produces eight regression models and selects one local regression model, then the local regression models from four mappers are sent to the reducer, and the reduce selects the global regression model, which is sent to the distributed file system.

The map-reduce framework is scalable because it may utilize any number of the nodes in a cluster to carry out the $2^k$ regression models.

Figure 6A:
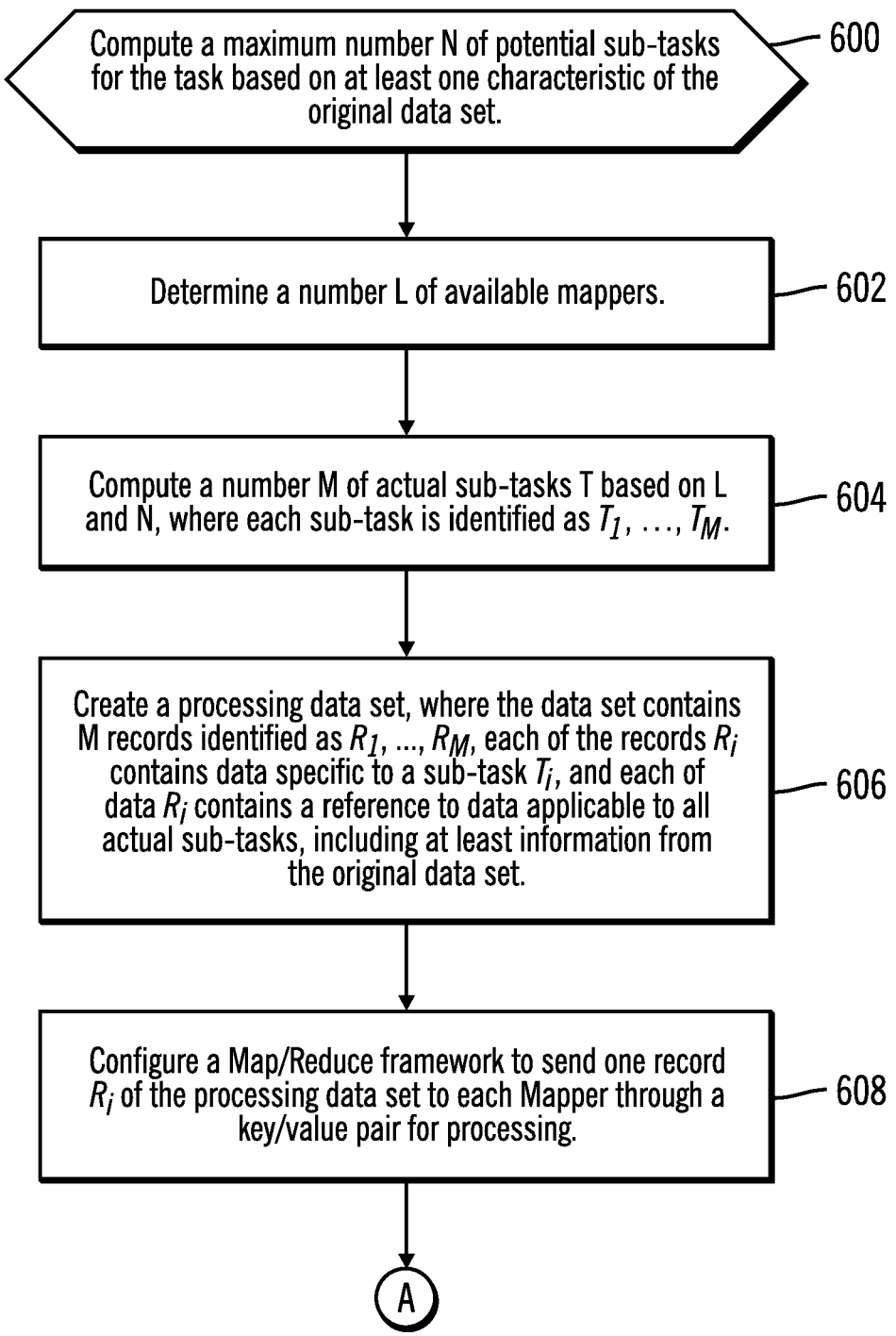
FIG. 6 illustrates, in a flow diagram, operations for using a map/reduce framework to perform a task on an original data set.
Figure 6B:
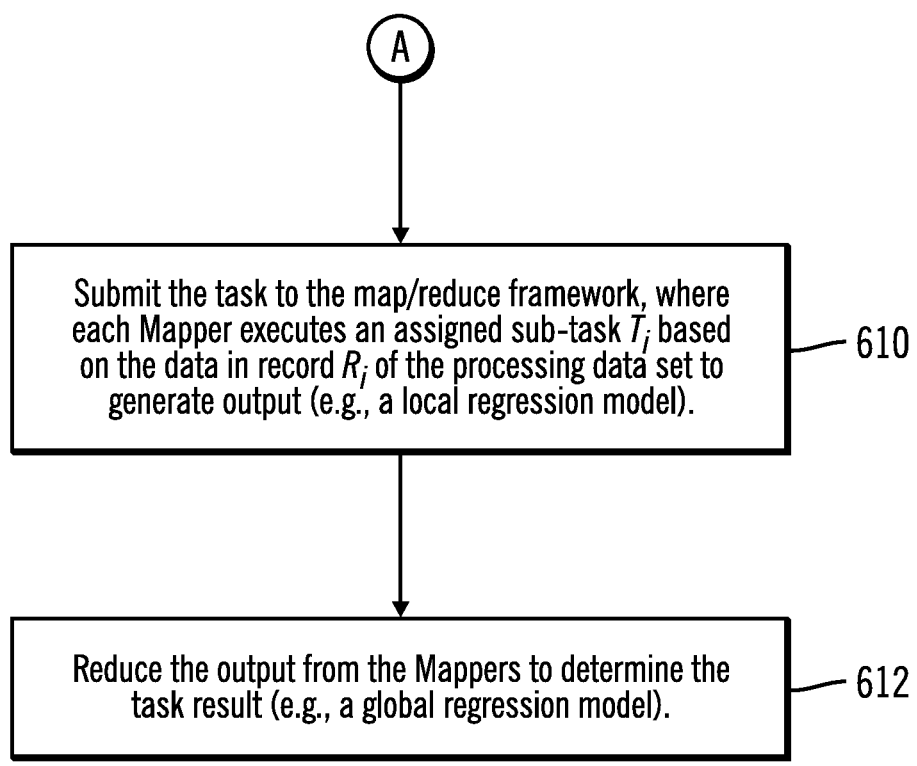

FIG. 6 illustrates, in a flow diagram, operations for using a map-reduce framework to perform a task on an original data set in order to leverage the latent capability of parallel computation in the map-reduce framework. FIG. 6 is formed by FIG. 6A and FIG. 6B. In certain embodiments, the task is to choose the linear regression model by sweeping the C matrix to computing all possible $2^k$ regression models. In such embodiments, the C matrix is the original data set.

Control begins at block 600 with a maximum number N of potential sub-tasks being computed for the task, based on at least one characteristic of the original data set. In certain embodiments, the maximum number of potential sub-tasks for the task is $N=2^k$. The characteristic of the original data set for computing the possible regression models is that dimension of the C matrix (the original data set) that is related to k because the C matrix is constructed based on X and Y and the number of predictors in X is k.

In block 602, a number L of available mappers is determined. In certain embodiments, the number L is the number of available CPU cores in the cluster.

In block 604, a number M of actual sub-tasks T is computed based on L and N, where each sub-task is identified as $T_1, \ldots, T_M$. Each sub-task ($T_i$) is performed by a mapper that tries to find a local linear regression model among $2^{k-m}$ regression models.

In certain embodiments, the number of actual sub-tasks is $M=2^m$, with m<k−1, so M<N ($=2^k$). In addition, the number of actual sub-tasks M is specified to be less than or equal to the number of mappers L to gain better efficiency (i.e., M≤L). Thus, in most situations, the relationship among M, L and N is M≤L<N.

However, in certain embodiments, the number of actual sub-tasks M may be greater than the number of mappers L (i.e., M>L). In such embodiments, some sub-tasks may be waiting in a queue until a CPU becomes available to process each of those sub-tasks.

In block 606, a processing data set is created, where the data set contains M records identified as $R_1, \ldots, R_M$, each of the records $R_i$ contains data specific to a sub-task $T_i$, and each of the records $R_i$ contains a reference to data applicable to all actual sub-tasks, including at least some information from the original data set. In certain embodiments, the processing data set is a temporary input file, where the file contains M rows identified as $R_1, \ldots, R_M$, each record $R_i$ contains a distinct leading-index sequence (the max size is m) for each sub-task $T_i$, and each record $R_i$ contains a reference to the C matrix and a list of (k−m) common-index predictors and other inputs applicable for all sub-tasks. In certain embodiments, the reference may also be passed to each mapper through a configuration API in a Hadoop framework.

In block 608, a map/reduce framework is configured to send one record $R_i$ of the processing data set to each mapper through a key/value pair for processing.

From block 608 (FIG. 6A), processing continues to block 610 (FIG. 6B).

In block 610, the task is submitted to the map/reduce framework, where each mapper executes an assigned sub-task $T_i$ based on the data in record $R_i$ of the processing data set to generate output (e.g., a local regression model). In certain embodiments, the sub-tasks $T_i$ are executed in the map/reduce framework, where each mapper gets a record $R_i$ and executes a sub-task $T_i$ by: (a) applying the sweep operation on the C matrix for a leading-index sequence; (b) generating a common-index sequence based on common-index predictors; (c) applying the sweep operation for the common-index sequence; and (d) finding the local regression model.

In block 612, the reducer reduces the output from the mappers to determine the task result (e.g., a global regression model). The task result may vary in different embodiments. For example, the task result may be simple or complex, depending on the problem to be resolved. In certain embodiments, the M local regression models are sent from mappers to the reducer to identify the global regression model.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a regression model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud regression model may include at least five characteristics, at least three service regression models, and at least four deployment regression models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant regression model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Regression models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Regression models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
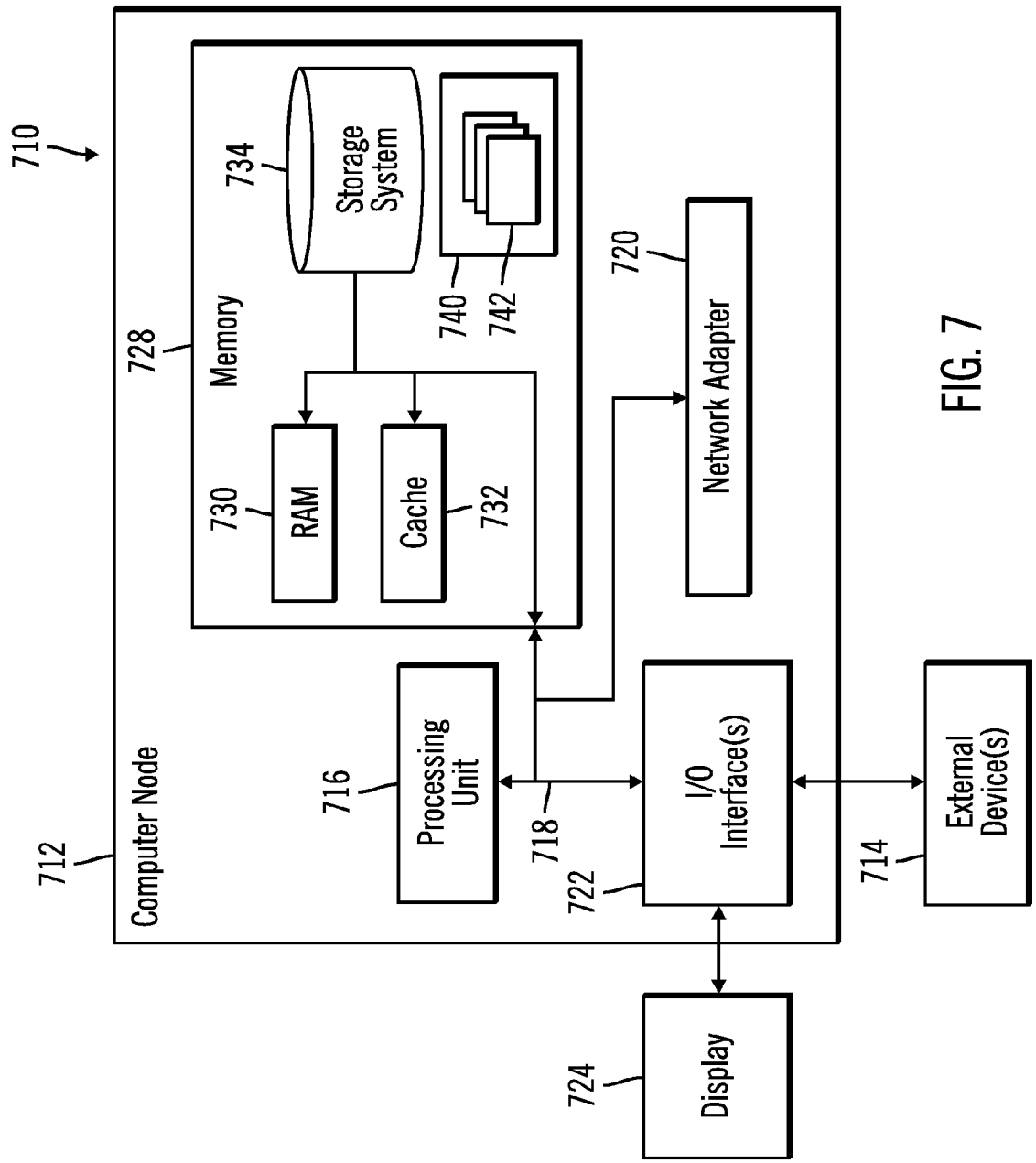
FIG. 7 depicts a cloud computing node in accordance with certain embodiments.

Referring now to FIG. 7, a schematic of an example of a cloud computing node is shown. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to a processor or processing unit 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
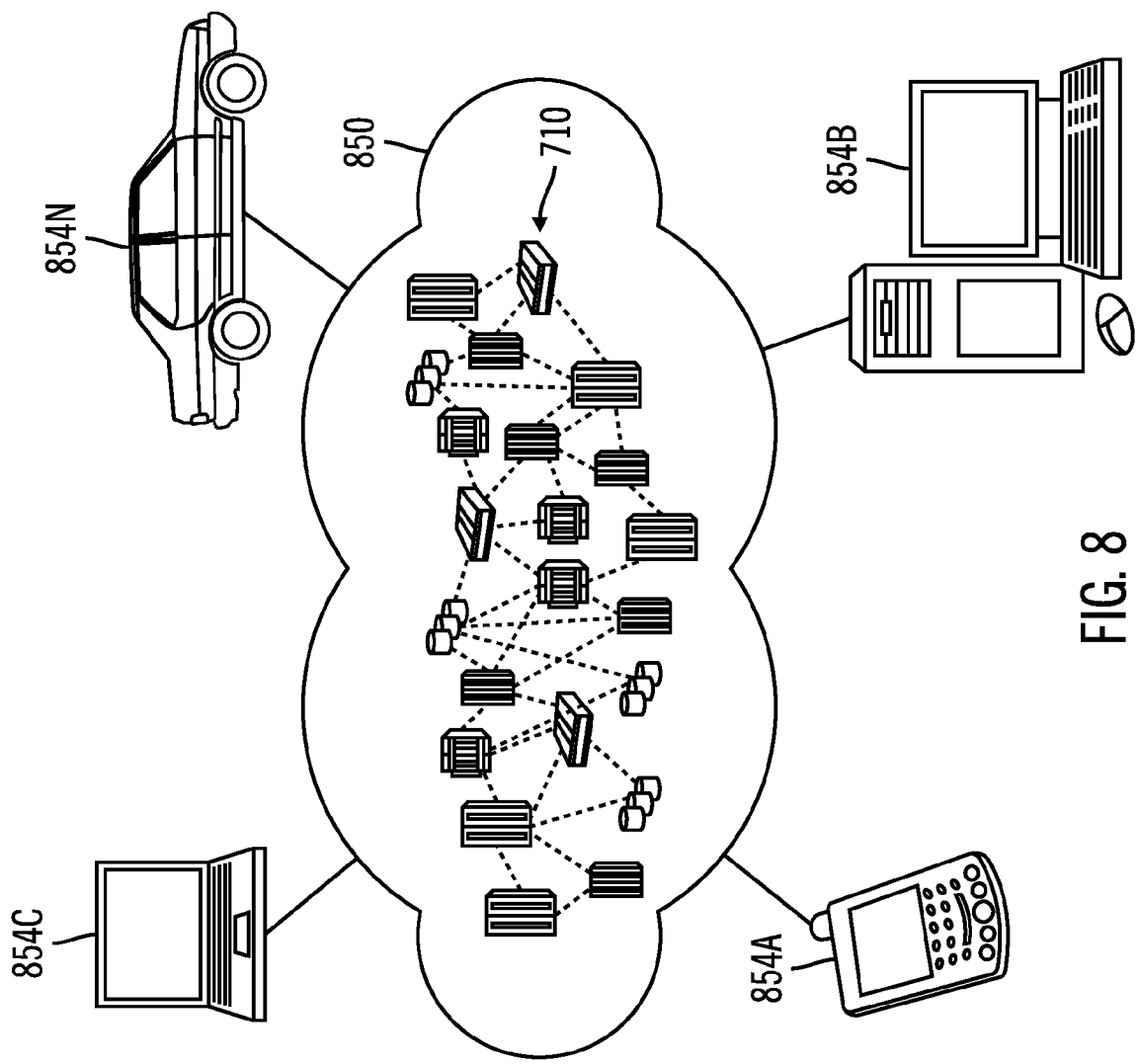
FIG. 8 depicts a cloud computing environment in accordance with certain embodiments.

Referring now to FIG. 8, illustrative cloud computing environment 850 is depicted. As shown, cloud computing environment 850 comprises one or more cloud computing nodes 710 with which local computing devices used by cloud consumers, such as, for example, personal digital assistant (PDA) or cellular telephone 854A, desktop computer 854B, laptop computer 854C, and/or automobile computer system 854N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 710 and cloud computing environment 850 can communicate with any type of computerized device over any type of network and/or network addressable connection (e.g., using a web browser).

Figure 9:
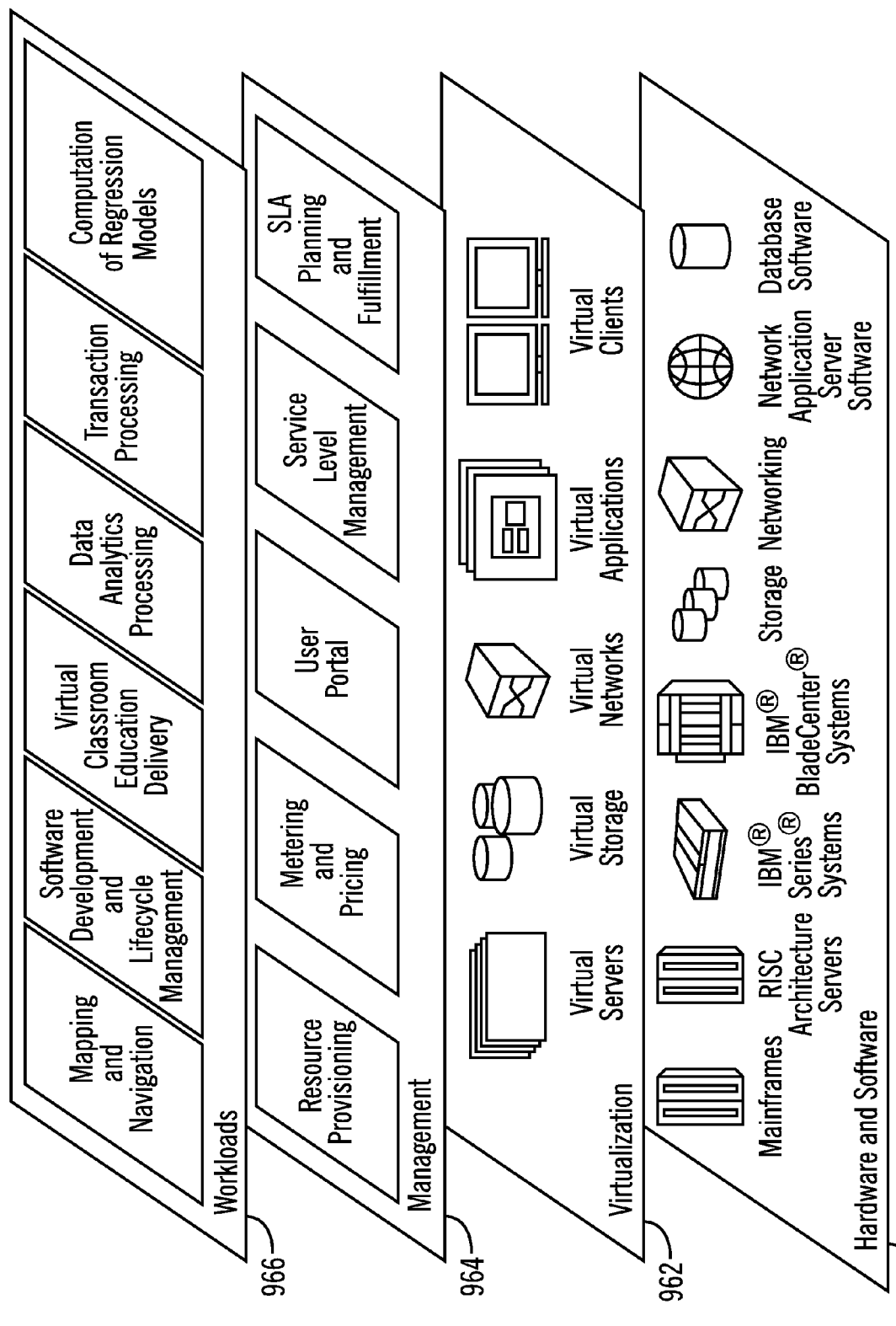
FIG. 9 depicts abstraction regression model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include mainframes, in one example IBM® zSeries® systems; RISC (reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual clients.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from this layer include: mapping and navigation; software development and lifecycle management; virtual classroom education delivery; data analytics processing; transaction processing; and computation of regression models.

Thus, in certain embodiments, software or a program, implementing computation of regression models in accordance with embodiments described herein, is provided as a service in a cloud environment.

Certain embodiments are implemented in a cloud environment. Certain alternative embodiments are not implemented in a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of flow diagram show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
   creating a processing data set of records, wherein each of the records contains data specific to a sub-task from a set of actual sub-tasks and contains a reference to data shared by the set of actual sub-tasks, and wherein a number of the records is equivalent to a number of the actual sub-tasks in the set of actual sub-tasks;
   with each mapper in a set of mappers,
      receiving one of the records of the processing data set, wherein the data specific to the sub-task is a leading-index sequence of a local search sequence, and wherein the data shared by the set of actual sub-tasks includes common-index predictors and a matrix;
      generating a common-index sequence using the common predictors;
      performing sweep operations on the matrix based on the leading-index sequence; and
      performing sweep operations on the resulting matrix based on the common-index sequence to identify a local regression model; and
   with a single reducer,
      reducing the local regression model from each mapper in the set of mappers to determine a global regression model.

2. The method of claim 1, further comprising:
   computing a maximum number of potential sub-tasks based on at least one characteristic of an original data set; and
   computing a number of actual sub-tasks in the set of actual tasks to be executed based on a number of mappers in the set of mappers available to execute the actual sub-tasks and the maximum number of potential sub-tasks.

3. The method of claim 2, further comprising:
   computing the number of actual sub-tasks, designated as M actual sub-tasks, where $M=2^m$, where $M \leq L$ and $m < k-1$, where L is the number of mappers in the set of mappers available to execute the actual sub-tasks, where k is a number of predictors.

4. The method of claim 3, further comprising:
   dividing the predictors into leading-index predictors and the common-index predictors.

5. The method of claim 4, further comprising:
   dividing a global search sequence into M multiple local search sequences;
   for each of the local search sequences, identifying a leading-index sequence from the leading-index predictors;
   creating a temporary input file with M records, wherein each of the records contains an identified leading-index sequence, and wherein each of the records contains the reference to the data shared by the set of actual sub-tasks that includes the common-index predictors and the matrix on which a sweep operation is applied.

6. The method of claim 1, wherein sending the leading-index sequence, without sending the common-index sequence, to each mapper in the set of mappers reduces network traffic.

7. The method of claim 1, wherein software is provided as a service in a cloud environment.

* * * * *